United States Patent
Boyce

(10) Patent No.: US 11,700,352 B2
(45) Date of Patent: Jul. 11, 2023

(54) RECTILINEAR VIEWPORT EXTRACTION FROM A REGION OF A WIDE FIELD OF VIEW USING MESSAGING IN VIDEO TRANSMISSION

(71) Applicant: INTEL CORPORATION, Santa Clara, CA (US)

(72) Inventor: Jill M. Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 17/360,449

(22) Filed: Jun. 28, 2021

(65) Prior Publication Data
US 2021/0329196 A1    Oct. 21, 2021

Related U.S. Application Data

(63) Continuation of application No. 16/990,436, filed on Aug. 11, 2020, now Pat. No. 11,064,155, which is a continuation of application No. 16/718,849, filed on Dec. 18, 2019, now Pat. No. 10,841,532, which is a
(Continued)

(51) Int. Cl.
| | |
|---|---|
| *H04N 7/14* | (2006.01) |
| *G06T 3/00* | (2006.01) |
| *H04N 19/167* | (2014.01) |
| *H04N 19/46* | (2014.01) |

(Continued)

(52) U.S. Cl.
CPC .......... *H04N 7/147* (2013.01); *G06T 3/0087* (2013.01); *H04N 19/167* (2014.11); *H04N 19/46* (2014.11); *H04N 19/597* (2014.11); *H04N 19/70* (2014.11)

(58) Field of Classification Search
None
See application file for complete search history.

(56) References Cited

U.S. PATENT DOCUMENTS

| | | |
|---|---|---|
| 10,560,660 B2 * | 2/2020 | Boyce .................. H04N 19/167 |
| 10,841,532 B2 | 11/2020 | Boyce |
| 2010/0045773 A1 | 2/2010 | Ritchey |

(Continued)

FOREIGN PATENT DOCUMENTS

| | | |
|---|---|---|
| WO | 2018093840 | 5/2018 |
| WO | 2018093851 | 5/2018 |

OTHER PUBLICATIONS

Ex-Parte Quayle Action for U.S. Appl. No. 16/718,849, notified Apr. 29, 2020.
(Continued)

*Primary Examiner* — Quoc D Tran
(74) *Attorney, Agent, or Firm* — Essential Patents Group, LLP

(57) ABSTRACT

Rectilinear viewport extraction from a region of a wide field of view is described using messaging in the video transmission field. Some embodiments pertain to a method that includes receiving a wide field of view video, receiving position data from a remote coupled user device, selecting a region of interest in the video based on the received position data, extracting the region of interest from the video, generating region metadata describing the extracted region of interest, encoding the extracted region of interest of the video, and transmitting the encoded video with the region metadata to the user device.

25 Claims, 7 Drawing Sheets

Related U.S. Application Data continuation of application No. 15/827,017, filed on Nov. 30, 2017, now Pat. No. 10,560,660.

(60) Provisional application No. 62/442,262, filed on Jan. 4, 2017.

(51) Int. Cl.
  *H04N 19/70* (2014.01)
  *H04N 19/597* (2014.01)

(56) References Cited

U.S. PATENT DOCUMENTS

| | | |
|---|---|---|
| 2010/0262907 A1 | 10/2010 | Shoemaker et al. |
| 2016/0092736 A1 | 3/2016 | Mai et al. |
| 2018/0160123 A1* | 6/2018 | Van Der Auwera ............... H04N 19/167 |
| 2018/0165934 A1 | 6/2018 | Pan et al. |
| 2018/0192001 A1* | 7/2018 | Boyce .................... H04N 19/46 |
| 2019/0158933 A1 | 5/2019 | Ouedraogo et al. |

OTHER PUBLICATIONS

ExParte Quayle Action for U.S. Appl. No. 16/990,436, mailed Nov. 25, 2020.
Final Office Action for U.S. Appl. No. 15/827,017, dated Jan. 31, 2019.
Notice of Allowance for U.S. Appl. No. 15/827,017, dated Oct. 21, 2019.
Notice of Allowance for U.S. Appl. No. 16/718,849, dated Jul. 27, 2020.
Notice of Allowance for U.S. Appl. No. 16/990,436, dated Mar. 24, 2021.
Office Action for U.S. Appl. No. 15/827,017, dated Aug. 8, 2018.
Office Action for U.S. Appl. No. 15/827,017, dated May 1, 2019.

* cited by examiner

11,700,352 B2

RECTILINEAR VIEWPORT EXTRACTION FROM A REGION OF A WIDE FIELD OF VIEW USING MESSAGING IN VIDEO TRANSMISSION

CROSS-REFERENCE TO RELATED APPLICATIONS

The present application is a continuation of and claims priority to U.S. patent application Ser. No. 16/990,436, filed Aug. 11, 2020, and entitled RECTILINEAR VIEWPORT EXTRACTION FROM A REGION OF A WIDE FIELD OF VIEW USING MESSAGING IN VIDEO TRANSMISSION, which is a continuation of and claims priority to U.S. patent application Ser. No. 16/718,849, filed Dec. 18, 2019 and entitled RECTILINEAR VIEWPORT EXTRACTION FROM A REGION OF A WIDE FIELD OF VIEW USING MESSAGING IN VIDEO TRANSMISSION, which is a continuation of and claims priority to U.S. patent application Ser. No. 15/827,017, filed Nov. 30, 2017 and entitled RECTILINEAR VIEWPORT EXTRACTION FROM A REGION OF A WIDE FIELD OF VIEW USING MESSAGING IN VIDEO TRANSMISSION, which claims priority to U.S. Provisional Application No. 62/442,262, filed Jan. 4, 2017 and entitled RECTILINEAR VIEWPORT EXTRACTION FROM A REGION OF A WIDE FIELD OF VIEW USING MESSAGING IN VIDEO TRANSMISSION, all of which are hereby incorporated by reference herein for all purposes.

FIELD

The present description relates to communication of encoded video, and in particular to extracting a viewport from a video using communicated messaging.

BACKGROUND

With the emergence of low cost high definition video cameras and high speed internet connectivity, video internet traffic is growing quickly. 360 degree video is an emerging trend in virtual reality, video conferencing, automotive, and surveillance applications, among others and is supported by wide field of view cameras, including 180 and 360 degree field of view cameras. Dedicated web sites and channels are also available to post and view 360 degree videos, including virtual reality content. For collaboration between groups of users, 360 degree video offers greater flexibility. Instead of switching between cameras, a remote viewer can move across a room using a 360 degree view and zoom in on people or objects of interest in the camera's view. Panoramic video playback systems using Virtual Reality (VR) head mounted displays (HMD) use high speed data connection and high speed processing in a HMD (Head Mounted Display) or other client device.

Panoramic or 360 degree video content is typically created by stitching together the 2D videos captured by multiple cameras into a spherical representation. In some cases, the multiple views are rendered in software. The spherical video is then projected into a format suited for video encoding, such as an equi-rectangular projection format or cube map projection format.

At the client, the bitstream containing the full panoramic compressed video frames is received and decoded. This creates a representation of the entire panoramic field of view, and a smaller viewport is selected for display. The particular portion of decoded video represented by the viewport is determined by the head position/orientation of an HMD, or through a position selection user interface when viewing on a normal 2D display.

A region from a panoramic video frame which contains the expected viewport to be viewed by a user may be extracted, projection mapped to a rectangular region in a rectilinear projection format, and re-encoded before the HMD receives the frame, in order to reduce the resolution required to be decoded at the client. This additional processing may be done in a MANE (Media Aware Network Element), or may be done in a computer that is connected to a HMD over a wireless network. The Media Aware Network Element signals information about the size and position of the extracted region, and the HMD uses this information to select the position of the viewport within this extracted region. The viewport is then used to determine which portion of the extracted region to display to the user.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

The viewer of a panoramic video playback system is only viewing a portion of the entire panoramic video, e.g. approximately 1/12th of the available area at a given time. In some systems, the client receives the entire video and then renders only a small part. In other systems, the client only receives the desired part, but this requires that the client indicate which part to receive. In both cases, the computational burden at the client is heavy. Lower complexity clients for panoramic/360 video/VR video systems are described herein.

A region from a panoramic video frame which contains the expected viewport to be viewed by a user may be extracted, projection mapped to a rectangular region in a rectilinear projection format, and re-encoded before the HMD receives the frame. This reduces the resolution and therefore the amount of data required to be decoded at the client. This additional processing may be done in a Media Aware Network Element, or may be done in a computer that is connected to a HMD over a wireless network. A structure and method for signaling the information of the size and position of the extracted region is described. This is sent to the HMD or other client to select the position of the viewport within this extracted region.

In some embodiments, supplemental enhancement information (SEI) messages containing metadata associated with a coded bitstream are described. A message can indicate a mode, referred to herein as viewport mode, that indicates that the coded video represents a specific region that had been extracted from a spherical panoramic video content and then mapped to a rectilinear projection of a format rectangle, which was then encoded.

This SEI message may also be used to include metadata to indicate the center position of the extracted region on the sphere, e.g. in terms of yaw, pitch, and roll, and the size of the region on the sphere in terms of the range of yaw angles and pitch angles. The region on a sphere may be characterized as bounded by arcs from two horizontal great circles and two vertical great circles. Great circles are diameters of a sphere, and small circles are not diameters. When mapped to a rectilinear projection, this region corresponds to a rectangle. In equi-rectangular projection format, the extracted region is not rectangular.

The SEI message may also contain the center position and size of the region on the sphere. As described herein an SEI message may be associated with rectilinear content, which had previously been extracted from a spherical video. This reduces the amount of video decoding performed by a client, by allowing the higher resolution decoding and extraction process to be performed earlier in a processing chain by a MANE. A simpler client can enable a lighter, smaller, less expensive HMD and a longer battery life.

Figure 1:
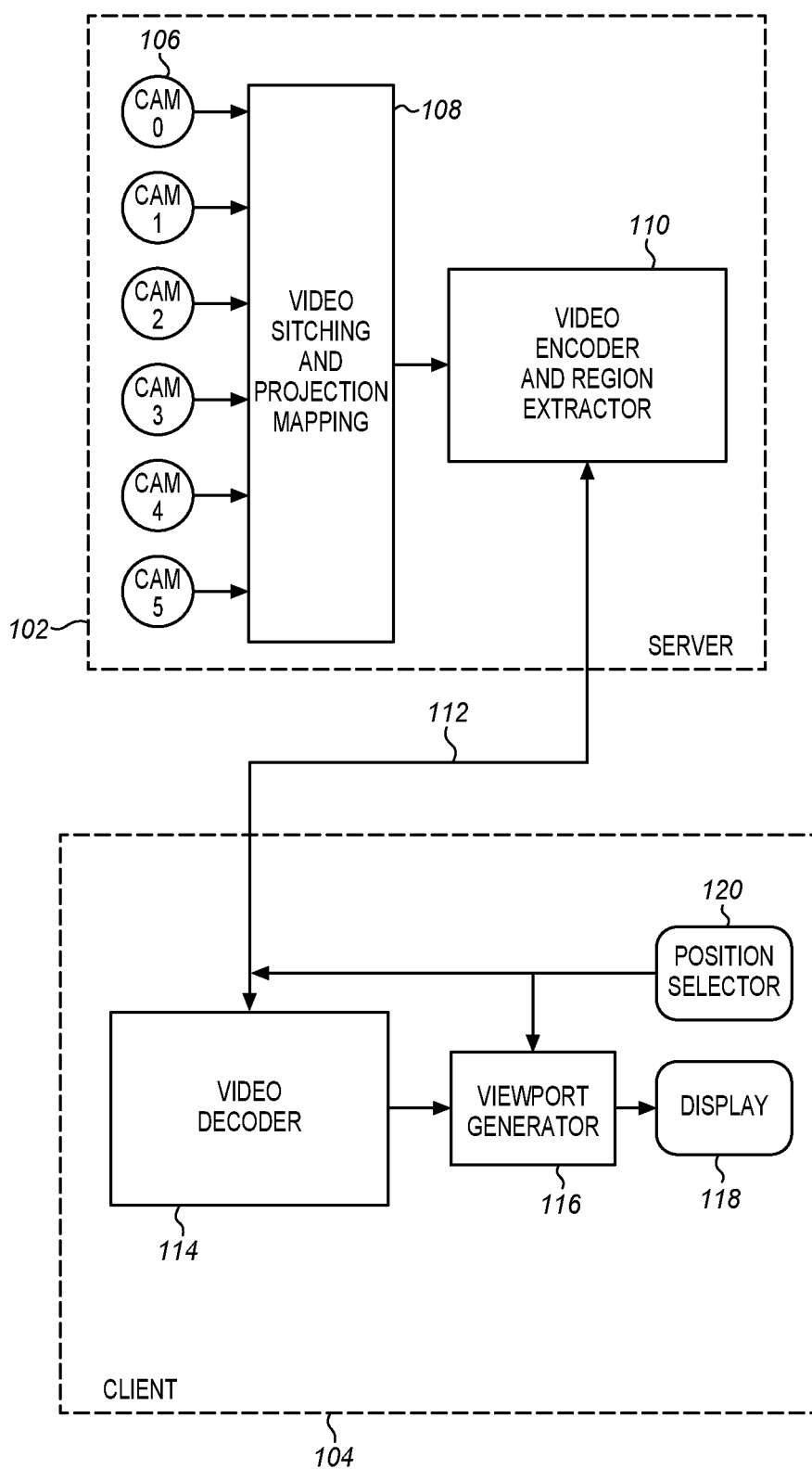
FIG. 1 is a block diagram of a panoramic video coding system according to an embodiment.

FIG. 1 is a block diagram of a panoramic video coding system. Video is produced at a server, production system or a combination of different systems 102. At the server, multiple cameras 106 capture 2D video. Six cameras are shown, but more or fewer may be used. The cameras are connected to a first module 108. At the first module, the multiple videos are stitched together and mapped to a projection format. The stitched video in the projection format is input to a video encoder 110, such as HEVC or AVC. The encoder encodes the video and sends or buffers it for later transmission as a bitstream. The buffer may be a part of the encoder or of another component.

The encoded video is sent as a bitstream through a network, Internet, broadcast, or point-to-point connection 112, from a server or head end to one or more clients 104. At the client, a video decoder 114 receives the video from the server and decodes the compressed bitstream. When only a portion of the decoded video is viewed, a viewport is generated in a viewport module 116 for that selected region. The portion of decoded video to view is determined by a position selector 120 using, for example the head position of a head mounted display or a position selection user interface. The position is sent to the viewport generator that receives the decoded video and provides a suitable video stream to a display 118. The display allows the viewport to be viewed on a normal 2D display.

When the position selector 120 indicates a viewport that is only a portion of the entire video, then this information may be sent back to the video encoder 110. In this case, the video encoder also acts as a region extractor. It extracts a region from the video received from the video stitching module 108 that includes the indicated viewport. The encoder only encodes and sends the extracted portion through the transmission link 112 to the video decoder 114. This reduces the amount of data sent over the link 112 between the encoder and the decoder. The viewport generator 116 then shows the received region directly or generates a viewport using the received extracted region and more recent information from the position selector 120. The size and position of the extracted region, the relationship between the extracted region and the displayed viewport, and the particular way in which the information is communicated is described in more detail below.

Figure 2:
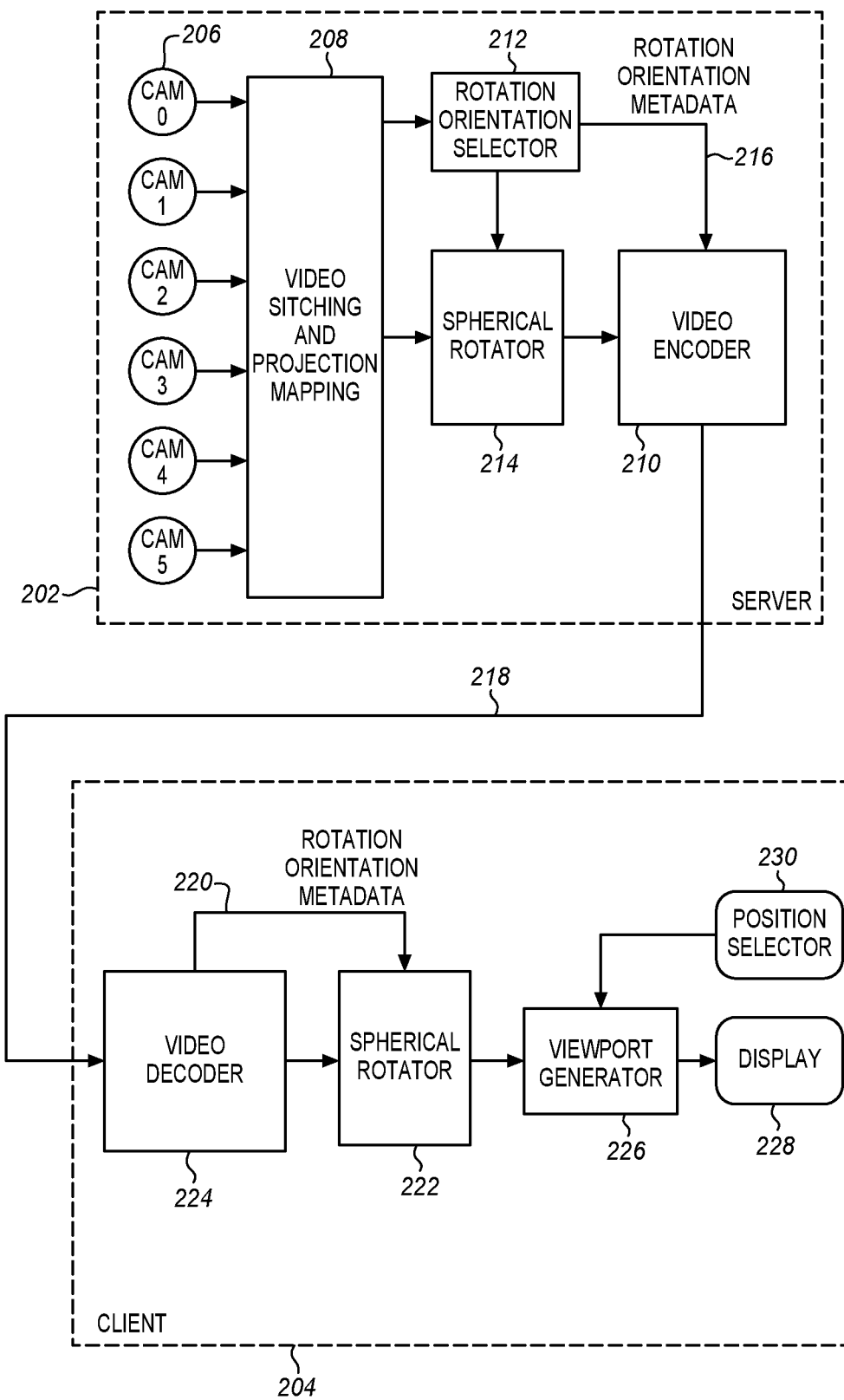
FIG. 2 is a block diagram of an alternative panoramic video coding system according to an embodiment.

FIG. 2 is a block diagram of an alternative panoramic video coding system. Video is produced at a server 202, production system or a combination of different systems. In some cases, multiple cameras 206 capture 2D video and provide it to the first stitching and projection module 208. The multiple videos are stored in a buffer in this module, stitched together at this module and mapped to a projection format. The stitched video in the projection format is input to a video encoder 210, such as HEVC or AVC.

The content creator, a commentator, editor, or any other actor may select a most interesting viewport region. Alternatively, an automated system may select a viewport region for example as an area with high motion rates or high texture features. The selection is applied to a region of interest (ROI) selector 212 that is coupled to the video encoder 210. The video encoder encodes the video received from the video stitching and mapping projection 208. The selected ROI is provided as information such as metadata 216 to the video encoder and is included in the video bitstream 218 by the encoder. The information may be encoded in any of a variety of different ways. The ROI may be provided in the form of metadata that is added to the video bitstream output of the encoder. The ROI metadata may be associated with a frame or a group of frames and therefore may be updated as often as once per frame.

One such way to encode the information is as metadata within the structure of a Supplemental Enhancement Information (SEI) message, however, any of a variety of other message structures may be used. There may be multiple ROI selections provided as multiple SEI messages from different editors or commentators. There may also be multiple ROI selections from a single editor to indicate more than one ROI. The user may then select from among any that cannot be displayed at the same time. The messages may conflict with one another or complement one another. Since SEI messages are associated with a particular frame, the viewport or ROI selection or suggestion may be changed with any frame.

SEI messages are related to HEVC (High Efficiency Video Codec, AVC (Advanced Video Coding), H.266 or MPEG-H in MPEG/VCEG (Moving Picture Expert Group/Visual Coding Experts Group) and other related video encoding standards. Other systems use similar messages and the structures and operations described herein may be adapted for those other systems as well.

The video encoder encodes the video, combines it with the SEI message and any other metadata and sends or buffers it for later transmission as a bitstream. The encoder may include a suitable buffer or another storage device may be incorporated into the encoder or another part of the server.

The encoded video is sent as a bitstream through a data link 218 such as a network, Internet, broadcast, or point-to-point link from the server 202 or head end to one or more clients 204. At the client, a video decoder 224 receives the video 218 from the server, decodes 224 the compressed bitstream 218 and extracts any SEI messages. A viewport generator module 226 receives the SEI messages with the selected ROI for the video and also a position from a user position selector 230. The viewport generator receives the decoded video and provides a suitable video stream to a display 228. This video stream may be immediately displayed or stored in a buffer or other storage that is in the viewport generator or connected to the viewport generator. At the client end, the viewer can select to follow the recommendation of the content provider to view the suggested viewport of the SEI message or the client can select a viewport using a position selection 230 or other sensors. In this way, the selected or recommended ROI can be overridden by the viewer.

The suggested viewport metadata is associated with a frame and therefore can be updated as often as once per frame. More than one suggested viewport can be indicated, if the content creator wishes to indicate more than one, for example to track multiple moving objects separately. This allows the viewer to select to watch, for example, a person or event within the panoramic view.

Figure 3:
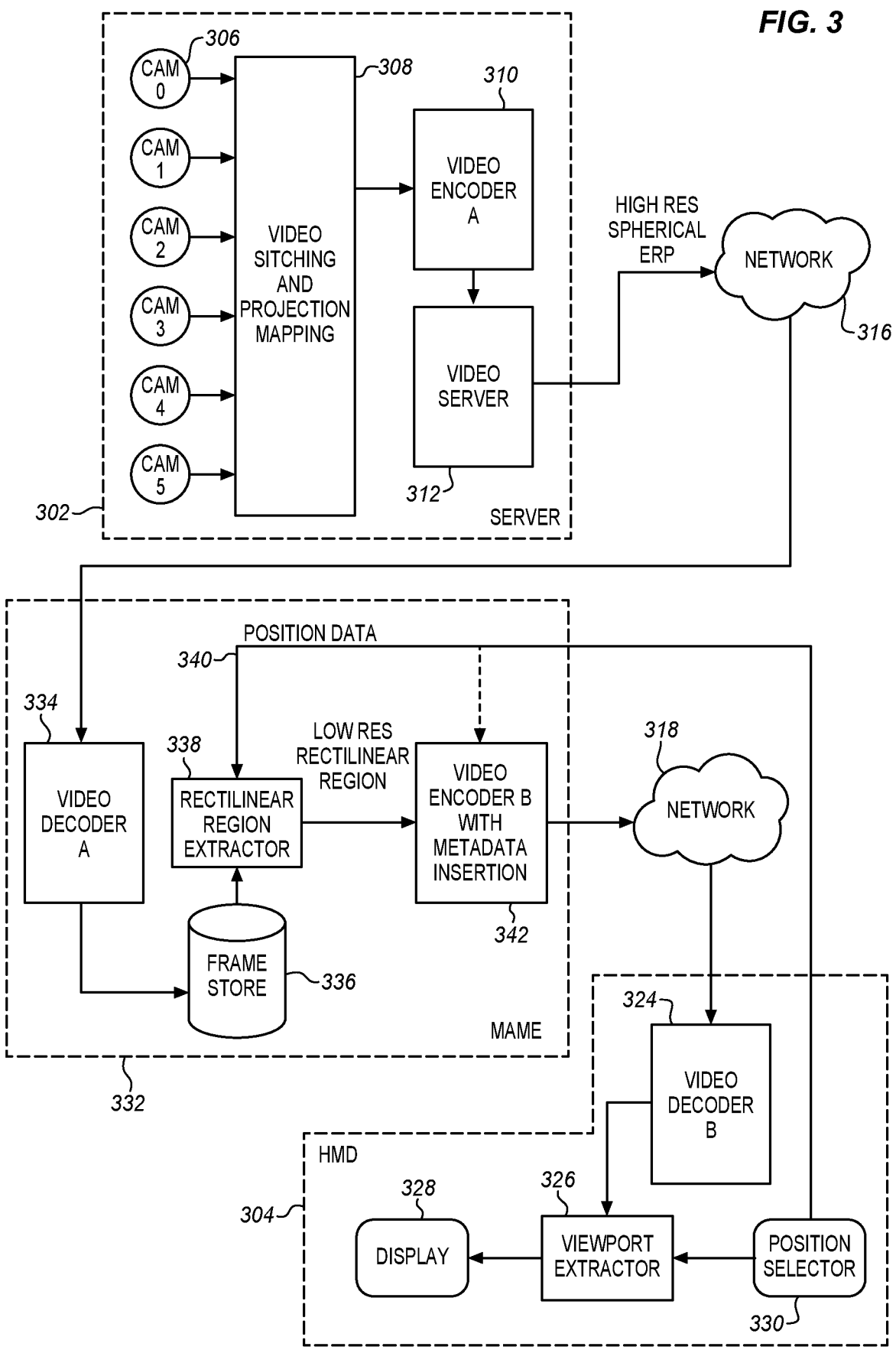
FIG. 3 is a block diagram of a further alternative panoramic video coding system suitable for use in a viewport mode according to an embodiment.

FIG. 3 is a block diagram of an alternative video coding system suitable for use in the viewport mode described above. Video is produced at a server, production system or a combination of different systems 302. Multiple cameras 306 capture 2D video and provide it to the first stitching and projection module 308. The multiple videos are stitched together at this module and mapped to a projection format such as ERP. The stitched video in the projection format is input to a video encoder 310, such as HEVC or AVC. The encoded video is stored in a video server 312 that also manages connection sessions and then supplies the encoded video to remote devices as appropriate. The spherical video in the projection format is encoded 310 and streamed from the video server 312 through a network 316 or other transmission or broadcast system.

A MANE (Media Aware Network Element) 332 between the encoder or server and a client 304 receives the encoded video from the server 302 through the network 332. This MANE may be at the same location as either the encoder/server 302 or the client 304, or may be at a different location.

The MANE has a decoder 334 that decodes the received high resolution video which represents the entire spherical or panoramic video, e.g. in ERP format, into a frame sequence that is buffered in a frame store 336. Based upon HMD position data 340 received from the client 304, and possibly the size of the field of view of the client display, a rectilinear region extractor 338 extracts a region of the spherical video and maps it to a rectangular region in a rectilinear format. The extracted region contains the viewport that would be viewed on the HMD for the position indicated by the client position data, possibly with a buffer region around it, and maps it to a rectilinear format.

In this example, in contrast to the example of FIG. 1, the full encoded wide field or spherical video is received at an intermediate device, in this case the MANE. The MANE decodes the video and performs the region extraction instead of the server extracting the region and encoding only the extracted region as in FIG. 1. After the MANE extracts the region, the video is encoded again before being sent to the client device, in this case an HMD. The video that arrives at the client device and the associated metadata is the same in both examples. In this example, the server does not need to modify its operation to suit any particular client device. In addition, the MANE may be connected to the client device in a way that reduces latency. In some cases, the MANE is within a few meters of the client device and communicates using a dedicated wireless link. This allows the region extracted by the MANE to arrive more quickly at the client device, improving the user experience.

That extracted region is encoded using a video encoder 342. This encoded video has far less data than the full video 316 received from the server 302. The MANE encoder also adds metadata to the coded bitstream as indicating the center of the extracted region. The position data is based on the received position data 340 from the client device that was used to extract the region before it was encoded. The position data may be indicated in a variety of different formats. As an example, pitch and yaw angle position, and the size of the extracted region on the sphere may be used. The region size may also be represented by a range of pitch and yaw angles. The metadata may be in the form of an SEI message or inserted using a systems layer of the encoding system. An SEI message may be added as metadata in the compression bitstream which indicates the center position of the spherical position of the extracted region in (yaw, pitch, roll), and its size in range of yaw and pitch angles. The bitstream containing the metadata is sent to a client, such as an HMD, through a network.

At the client 304 a video decoder 324 decodes the received video. The decoded video is provided to a viewport extractor 326. The actual displayed viewport at the client is extracted by cropping the decoded rectangle received from the MANE, and adjusting for movement of the HMD 304, the size of the decoded rectangle, and the field of view of the client display. The cropping is based on the same position data 340 that was sent to the MANE. The HMD has a position selector 330 that generates the position data 340 that is supplied to the viewport extractor of the HMD 304 and also to the region extractor 338 and encoder 342 of the MANE 332. The position selector may rely on inertial sensor in a HMD, a user interface to select a position or viewport or a combination of multiple elements to indicate view and perspective.

Using metadata, the client HMD position and orientation may change continuously and be updated frame-by-frame. Latency may occur in the system of FIG. 3 during many different operations. These include a) determining the initial HMD position; b) transmitting the HMD position to the MANE; c) extracting the rectangular region in the rectilinear projection format based on the initial position; d) encoding the extracted rectangular region with the insertion of the SEI message; e) transmitting the coded bitstream to the client; f) decoding the coded bitstream at the client; and g) determining the current HMD position, among others.

At the HMD or another type of client, the current HMD position may change after the MANE finishes video encoding. As a result, the actual desired viewport to display at a given time may differ from the region extracted at the MANE. The region extractor at the MANE may extract a larger region for encoding to accommodate this possibility. The larger region contains the region corresponding to the initial position on the sphere received from the HMD as well as some additional buffering area on one or more sides of the initial position. The displayed viewport is extracted from the decoded rectangular region using simple cropping based upon the metadata describing the rectilinear rectangular region and the current position at the HMD. In some embodiments, the rectangular region is described by the spherical center position (yaw, pitch, roll) and the range of yaw and pitch angles. The current position is described by the virtual field of view of the client display at the current position.

While an HMD is described in these examples, any type of user display or apparatus that provides a viewport on a larger scene may be used. The display may be wearable, handheld, portable or fixed. The principles herein may be applied to a room projector, a monitor, or any of a variety of different gaming and entertainment devices.

Figure 4:
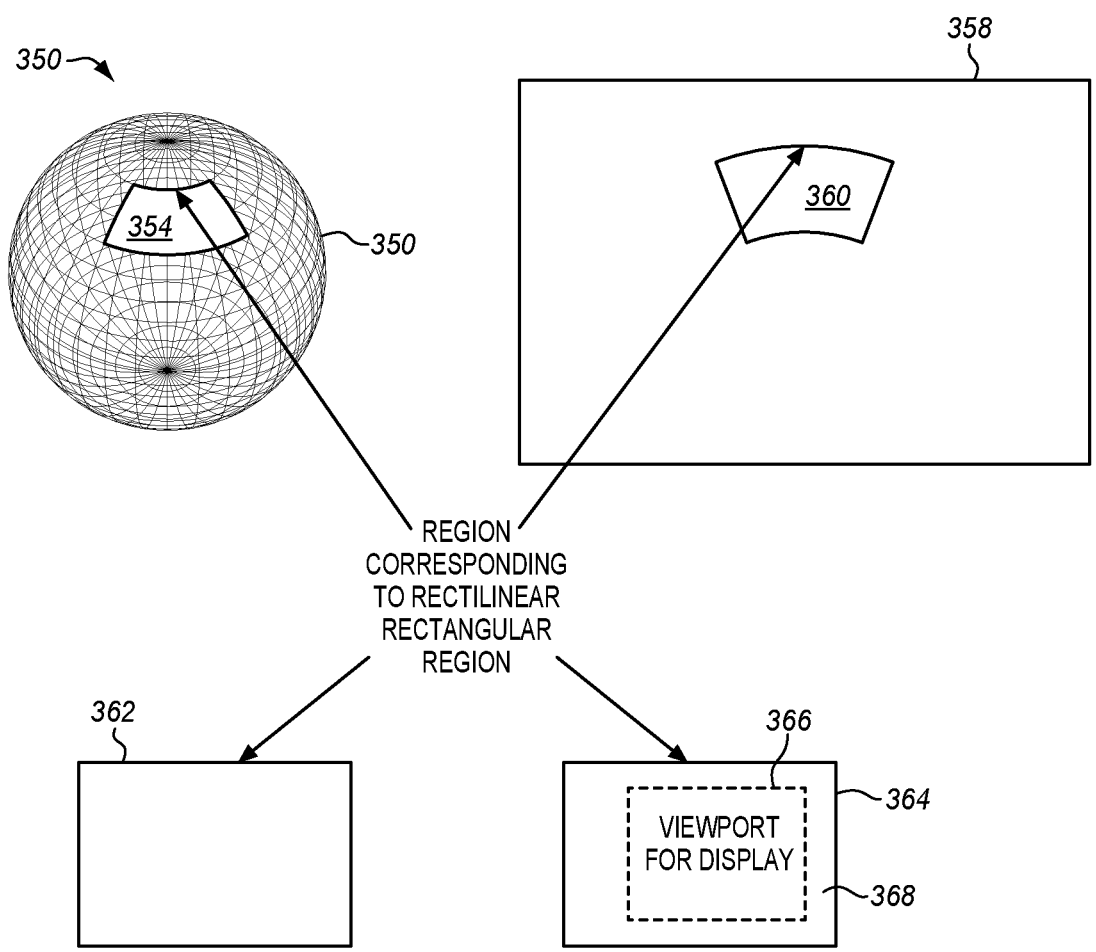
FIG. 4 is a diagram of an equi-rectangular projection format showing areas corresponding to an extracted region and a viewport on various projections.

FIG. 4 is a diagram of an equi-rectangular format showing areas corresponding to an extracted region and a viewport on various projections. A spherical projection 350 shows the extracted region 354 on an original spherical view 352 as a spherical projection. As shown the extracted region is bounded by two horizontal great circles at the top and the bottom and two vertical great circles, one on either side. The same region 360 may be projected using an equi-rectangular projection (ERP) 358. The region 362 may also be projected as a rectilinear projection of the sphere onto an unwrapped rectangular planar grid. In addition a viewport 366 of the extracted region 364 may be taken from any of the rectilinear projections in which a portion 366 is cropped out based on a current HMD position as provided by the position sensor or selector 330.

The boundary around the viewport 366 defines the limits of the viewport that was requested from the user in the position data. The viewport center and its horizontal and vertical extent are defined by metadata from the user, such as the SEI as described above. There is a margin 368 around the boundary of the viewport defined by the difference in size between the extracted region 364 and the viewport 364. In embodiments, the extracted region is intentionally larger than the viewport to create this margin. As shown, the extracted region includes an expected user device viewport plus a margin around the borders of the viewport.

The margin accommodates minor changes in HMD position that may occur after the region was extracted in the MANE but before the viewport is generated in the HMD. Before generating the viewport at the client, e.g. the HMD, the client is able to acquire more recent position data and shift the viewport in one or two directions as far as is allowed by the margin. The current position data may be accommodated as long as the difference between the received viewport and the current viewport is small, i.e. within the margin. By generating a new viewport at the client, the client system compensates for the small delay between sending a viewport to the MANE and then receiving an updated viewport from the MANE. By compensating for this latency, the user has a more realistic and responsive experience and is less prone to motion sickness. The size of the margin may be adapted to accommodate the system's latency. If the MANE responds very quickly to the position data from the client, then only a small margin is required.

While an equi-rectangular format is shown, the structures and operations may be applied to other projections and formats, such as a cube map projection, an icosahedral projection, octahedral, truncated square pyramid, and any of a variety of other types of polygonal projections.

Table 1 is an example of a syntax for an SEI message with metadata parameters for region extraction in a spherical video. This syntax may be used with existing video codec standards, such as HEVC and AVC, because it doesn't change the core encoding or decoding process.

The metadata includes the information needed to generate a viewport, which includes the position of the center of the viewport in the spherical representation, as represented by longitude and latitude, and the horizontal and vertical field of view sizes, in angles. Although other types of representations may be used to indicate an extraction region, using the spherical representation as the basis allows the same syntax to be used for any projection format or layout, such as equi-rectangular projection, cube map projection, octahedral projection, icosahedral projection, truncated square pyramid projection, etc.

The ROI or viewport position metadata can be sent for an entire coded video sequence, and/or per frame. The signaled values, i.e. latitude, longitude, and field of view parameters in the metadata, indicate a viewport to be applied to the output images following the decoder. If frame packed stereo video is contained within the video frame, the ROI for the second frame for the stereo view may be indicated in different ways. In one implementation suggested viewport values can be sent separately for each view. In another implementation, values for the second view can be derived based on the first view's value. This may be done considering any information about the relative position of the second view to the first view.

TABLE 1

Syntax for viewport info SEI message

|  | Descriptor |
|---|---|
| spherical_viewport( payloadSize ) { |  |
|   spherical_viewport_cancel_flag | u(1) |
|   if( !spherical_viewport_cancel_flag ) { |  |
|     spherical_viewport_mode | u(1) |
|     spherical_viewport_precision | ue(v) |
|     spherical_viewport_yaw | se(v) |
|     spherical_viewport_pitch | se(v) |
|     spherical_viewport_roll | se(v) |
|     spherical_viewport_range_yaw | se(v) |
|     spherical_viewport_range_pitch | se(v) |
|     spherical_viewport_persistence_flag | u(1) |
|   } |  |
| } |  | spherical_viewport_mode indicates whether the viewport has been extracted from the spherical video or whether the system is operating in a different mode.

spherical_viewport_precision indicates the precision of the viewport in terms or resolution or another parameter.

spherical_viewport_cancel_flag equal to 1 indicates that the SEI message cancels the persistence of any previous spherical viewport SEI message in output order. spherical_viewport_cancel_flag equal to 0 indicates that spherical viewport information follows. This may be used so that a viewport SEI is used only when there is a change in the viewport.

spherical_viewport_persistence_flag specifies the persistence of the spherical viewport SEI message for the current layer. spherical_viewport_persistence_flag equal to 0 specifies that the spherical viewport SEI message applies to the current decoded picture only.

spherical_viewport_persistence_flag equal to 1 specifies that the spherical viewport SEI message persists for the current layer in output order until a condition is met.

Table 2 provides an alternative omnidirectional viewport SEI message syntax.

TABLE 2

Alternative syntax for viewport info SEI message

|  | Descriptor |
|---|---|
| spherical_viewport( payloadSize ) { |  |
|   spherical_viewport_id | u(10) |
|   spherical_viewport_cancel_flag | u(1) |
|   if( ! spherical_viewport_cancel_flag ) { |  |
|     spherical_viewport_persistence_flag | u(1) |
|     spherical_viewport_cnt_minus1 | u(4) |
|     spherical_viewport_azimuth_centre | i(32) |
|     spherical_viewport_elevation_centre | i(32) |
|     spherical_viewport_tilt_centre | i(32) |

TABLE 2-continued

Alternative syntax for viewport info SEI message

| | Descriptor |
|---|---|
| spherical_viewport_hor_range | u(32) |
| spherical_viewport_ver_range | u(32) |
| } | |
| } | |

In some embodiments, the spherical viewport SEI message specifies the coordinates of one or more regions of spherical-coordinate geometry, bounded by four great circles, corresponding to viewports recommended for display when the user does not have control of the viewing orientation or has released control of the viewing orientation to the viewport recommendations.

spherical_viewport_id contains an identifying number that may be used to identify the one or more recommended viewport regions.

spherical_viewport_cnt_minus1 plus 1 specifies the number of recommended viewport regions that are indicated by the SEI message. When omni_viewport_cnt_minus1 is greater than 0 and there is no information on which recommended viewport is suggested to be displayed, the following applies:

spherical_viewport_azimuth_centre and spherical_viewport_elevation_centre indicate the centre of the viewport region which had been extracted from a spherical representation, in units of $2^{-16}$ degrees, radians, or any other desired units relative to the global coordinate axes.

spherical_viewport_tilt_centre indicates the tilt angle of the viewport region which had been extracted from a spherical representation, in units of $2^{-16}$ degrees. spherical_viewport_hor_range indicates the azimuth range of viewport region which had been extracted from a spherical representation. spherical_viewport_ver_range indicates the elevation range of the viewport region which had been extracted from a spherical representation.

The specific definitions of each of these parameters, the units, and the ranges of values may be modified to suit any other particular implementation. Similarly, any one or more of the parameters may be deleted or replaced with a different parameter to suit other implementations. Additional parameters may be added and the order of the parameters may be modified to suit different implementations.

In the examples shown herein, the video is spherical, however a complete sphere is not required. The video may contain only a portion of a sphere. The 180° field of view mentioned above is only half of a sphere. The field of view may be reduced both horizontally and vertically to show only a portion of a sphere. On the other hand, the field of view is curved in the manner of a portion of a sphere. This allows the image to be the same distance from a viewer in all directions.

This curved image is then projected onto a planar surface using any desired type of geometry including the examples shown above. While the curved field of view, being all or part of a portion of a sphere, has no inherent distortions, a planar projection of such a curved surface does have distortions. The planar projection, however, is well suited to encoding, compression, and other image processes.

The size of the viewport may be used to create a zooming effect in which the user's view is made wider or narrower depending on the size of the viewport. In another embodiment, the user's view remains the same size so that a larger field of view for the viewport may fill the user's entire field of view. A smaller field of view for the viewport may fill only a part of the user's field of view. The smaller field of view may allow the user to move the viewport to different positions to see elements beside the recommended viewport.

A region position may be expressed in many different ways. In spherical coordinates, roll, pitch, and yaw are used to express position on the sphere. One or more of these may be used or Cartesian coordinates, e.g. vertical and horizontal may be used with reference to the projection. In Table 2, azimuth and elevation are used. For roll, pitch, and yaw, it is not required that all three be used. Only one may be required to indicate a region of interest away from the poles. A second coordinate may be used to indicate distance from the left and right seam edges. Position for roll, pitch, and yaw or for azimuth and elevation may be expressed as an angle.

The selection of a viewport may be made for each frame of the video or for each frame in which the region of interest moves. SEI messages are tied to a particular frame so that each frame at which the region of interest has moved may have its own viewport message. In some cases, the message may be to cancel a viewport selection for the next set of frames until a new viewport message is received. This may be done using a viewport cancel or persistence flag. This allows each scene and region of interest change to be flagged with a different SEI message to change the viewport for the corresponding frame.

At the receiver or client side, the encoded video, including the metadata, such as an SEI message, is received from the server or broadcaster. The client has a decoder to decode the video and to extract the viewport metadata. A viewport may then be generated for the decoded video based on the viewport metadata. This viewport of the video is then provided to a display, such as a headset, 3D monitor, or 2D display screen for viewing by the user. For many applications, there will be a viewport selected by the user. This may be done through a conventional user input device or through some other sensor. For a VR headset, the movement of the headset or user's eyes may be detected and the viewport determined based on where the user is looking. A viewport generator may then generate a view of the decoded video using either the recommended viewport from the metadata, or the user's selected viewport or a combination of the two.

As mentioned above, the received encoded video is a projection of a wide field of view received from multiple cameras or generated by a graphics system. The projection may be an equi-rectangular projection or any other suitable planar projection. Many video encoding systems allow metadata, such as SEI messages, to be associated with a particular frame of the encoded video. The viewport may then be maintained until the next message comes. As a result, additional metadata can be received for additional frames of the encoded video.

Figure 5:
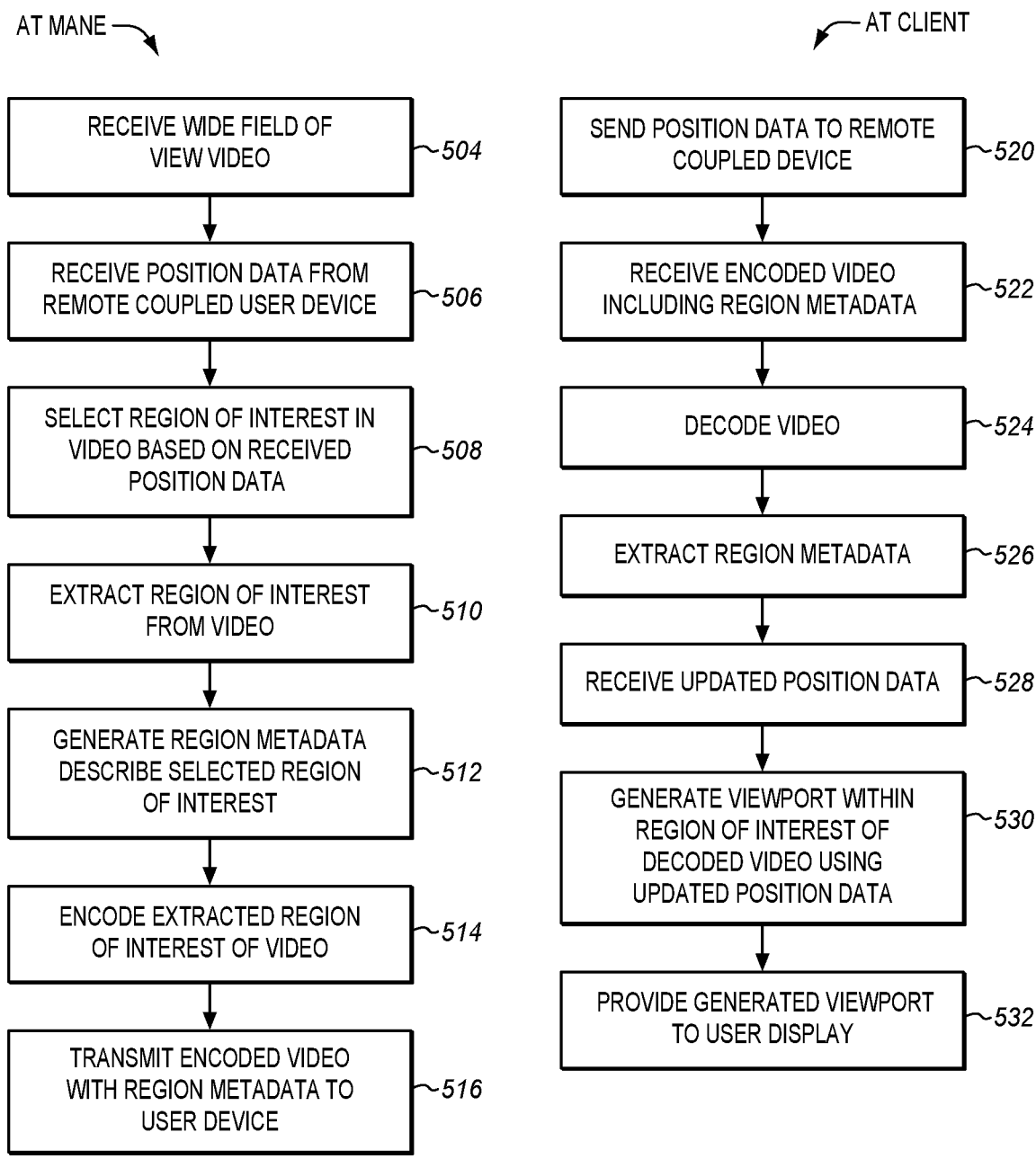
FIG. 5 is a process flow diagram of extracting a viewport and using messaging in a video transmission according to embodiments.

FIG. 5 is a process flow diagram of extracting a viewport and using messaging in a video transmission. The first part of the process is performed at an intermediate computing device such as the MANE of FIG. 3, the tethered computer 510 of FIG. 6 or any other suitable device. The original video is received from a central, head-end, broadcast, or server source on a local network, wide area network or the Internet. As shown in FIGS. 1, 2, and 3, this video may be stitched, projection mapped, and encoded before transmission. However, any one or more of these operations may be skipped. The video may be from a single camera and not stitched or may be transmitted without first being mapped.

This wide field of view video is received at the intermediate computing device such as the MANE or tethered computer at 504. The video will be decoded as necessary. It may also be mapped to a spherical form from the rectilinear projection. The spherical format may make it easier to determine viewports, field of view etc. In some embodiments, the entire sphere of video is decoded. This video may be from multiple cameras or from a single camera with a spherical, hemispherical or other wide field of view lens.

In addition to the video the intermediate device is coupled to a user display or user interaction device such as an HMD, although other types of devices may be used. This device is referred to here as a remote coupled user device. The remote device may not be very far away but is remote in that it is coupled or tethered to the intermediate device through a communications channel on a wired or wireless interface. The remote device has a position selector that generates a position and this is then sent as position data to the intermediate device which receives position data from the remote coupled user device at 506. The position data may be in any of a variety of different forms including as an SEI similar to a viewport message as shown in Table 1 or Table 2.

At 508, the MANE or similar device selects a region of interest in the video based on the received position data. If the position data is a viewport then the same or a similar viewport may be selected. At 510, the MANE extracts the region of interest from the video. In some embodiments, the extracted video will include a viewport based on the received position data plus an additional margin around the viewport boundary. The viewport of the extracted video provides the expected user device viewport based on the position data. When a margin is added to the extracted region, then this margin may be used to allow the user viewport to be shifted within the margin by the coupled user device. These adjustments accommodate changes to the position data from the time that it is sent to the MANE until the time that it is displayed to the user.

At 512 region metadata is generated to describe the selected regions of interest. This serves to identify the region that was extracted from the video based on the region of interest selection operation. The metadata may take the form of Table 1 or Table 2 or any other suitable form. These forms identify a center location on the sphere for the extracted region. The center may be identified as latitude and longitude, as azimuth and elevation or in another way. The region may also be identified with an indication of the size of the extracted region, such as by horizontal and vertical angle or distance, by an angular distance or in any other suitable way.

At 514 the extracted portion of the video is encoded by the encoder of the MANE. This part of the video is then transmitted at with the region metadata 516 to the coupled or tethered user device. There are a variety of other metadata signals that may be included in addition to identifying the region of interest or the position and size of the extracted part.

By extracting and transmitting only a portion of the video, at least three significant advantages are obtained. First, the total amount of transmitted video data is reduced. This means either that the same amount of video is transmitted with less demand on the tethered or coupled connection or that more detail may be transmitted about the same region without additional demand on the link. Second the sizes of buffers and memories used for transmission are reduced due to less data being sent. Third, the processing demands on the HMD are reduced because the HMD is required to process a smaller amount of data.

After the extracted video region is sent to the coupled or tethered device then it is received at the remote coupled device at 522. This extracted region of the video includes region metadata that describes the region of interest that was extracted and is now forms the received encoded video. By identifying the extracted region, the viewport extractor is able to determine how the extracted region of interest compares to the desired viewport and make any adjustment that may be needed to match the position data from the position sensor.

Earlier the remote device at 520 had sent position data to the MANE or similar device. The position data may be in the form of a viewport SEI as in Tables 1 and 2 and the received metadata may also be in the form of a viewport SEI as in Tables 1 and 2. This allows the region of interest to be compared to what was requested and also to the updated current position sensor information. As mentioned above, other forms may also be used to convey the viewport or position data using other parameters.

At 524 the video is decoded and at 526 the region metadata is extracted. This metadata may be embedded in the encoded video or transmitted alongside the video depending on the type of encoding being used. This decoded video is normally a rectangular projection of some kind from a spherical or hemispherical original video and includes only a smaller region of that very wide field of view video. The remote device, such as the HMD, therefore, only processes the smaller region requiring less memory and processing power.

At 528 the HMD receives updated position data from the local position selector. This position data is updated in that it is more recent than the position data that was earlier sent to the MANE at 520. Like the earlier data, the updated position data may be based on inertial sensors that detect movement of a wearable or handheld device such as an HMD. Alternatively, the position sensors may be from button, trigger, touchscreen or other actuators of a user controller. The position data may also be from a more conventional user input device such as a mouse and keyboard or the like.

At 530 the updated position data is used to generate a viewport within the region of interest of the decoded video. The viewport extractor can compare the region of interest metadata to the updated position data. If they are the same then the viewport extractor simply uses the region of interest that was received from the MANE and decoded. The margin around the region of interest may be removed if one was provided to match the desired field of view for the viewport.

On the other hand, if the updated position data differs from the earlier position data sent to the MANE, then the viewport extractor may compare the two and shift the viewport horizontally, vertically or both in order to move the viewport to correspond to the updated position data. This corresponds to the shifting the received region of interest in one or more directions. The viewport extractor may also zoom in or out to reflect a larger or smaller viewport in the updated position data. The extractor is able to zoom out by including more of the margin in the viewport. The extractor is able to zoom in by increasing the amount of margin in the viewport extractor.

At 532 the viewport is provided to the user display. In the case of the HMD, the display is closely integrated with the user interface. However, other types of display may be used such as large and small projectors, television, monitors, etc.

Figure 6:
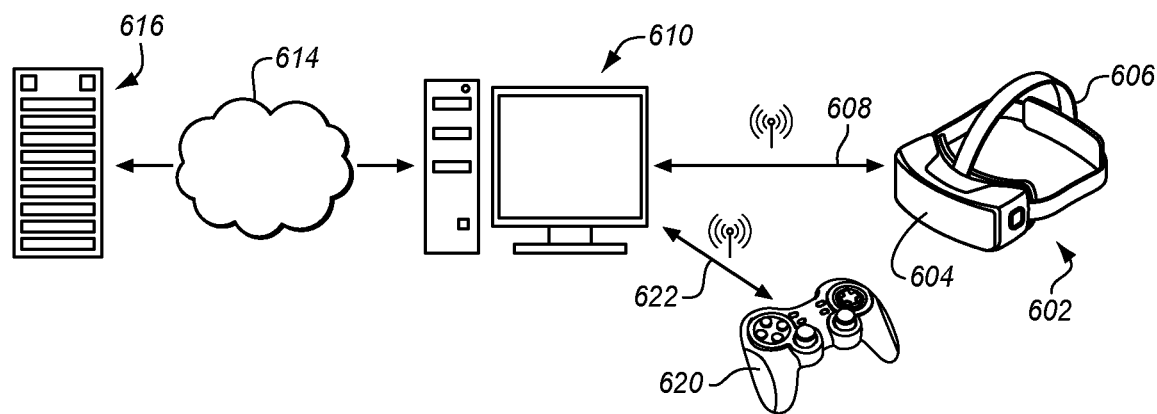
FIG. 6 is a block diagram of a head mounted display with connected computing resources suitable for embodiments.

FIG. 6 is a diagram of high performance HMD (Head Mounted Display) with multiple remote information sources. An HMD 602 has a main body 604 and an attachment strap 606. The main body carries user displays and speakers to render the virtual world to the wearer. The main body also has inertial sensors, a microphone and other user input devices. A processing, communications, and power or battery suite allow the HMD to render video and sound and to communicate wirelessly 608 with a tethered computer 610.

The user interacts with the virtual world through head and body movements and may also interact using voice commands, hand gestures and other user input devices. A game controller 620 may be coupled to the tethered computer through the same 608 or another 622 wireless interface to provide additional controls. The HMD may be coupled to the computer through a WiFi, WiDi, or other high speed digital wireless connections to receive rendered or compressed video frames and audio from the computer for display to the user. Additional descriptions, data, parameters, and commands may also be received from the computer. The HMD may also send command, control, and virtual interaction data to the computer through the same or another wireless link. The controller, for example may communicate through Bluetooth or unlicensed bands. Multiple wireless interfaces may be combined to provide the complete user experience.

In some cases, the computer is portable and carried by the user. This allows for a wired connection, if desired. The carried computer may have a notebook, tablet, smartphone, or any other desired physical configuration. In other cases, the computer is fixed and is attached to the HMD using a wired connection.

The computer may in turn be connected through the Internet, a LAN (Local Area Network) or other connection 614, wired or wireless, to a remote server 616. The remote server provides encoded video and may provide additional information about the virtual world. The remote server may also provide communication with other users that are experiencing the same or a related virtual world. Alternatively, the HMD may communicate directly with the server without going through the computer 610. In other embodiments, no remote server is used and the tethered computer operates independently.

In the examples herein, a wireless HMD has a local computing resource or client device, such as a CPU (Central Processing Unit) that may be coupled to a GPU (Graphics Processing Unit), graphics processor, memory and other resources to allow the HMD to store and render received encoded video. The local rendering may include rotation and viewport generating as described, among other tasks.

Figure 7:
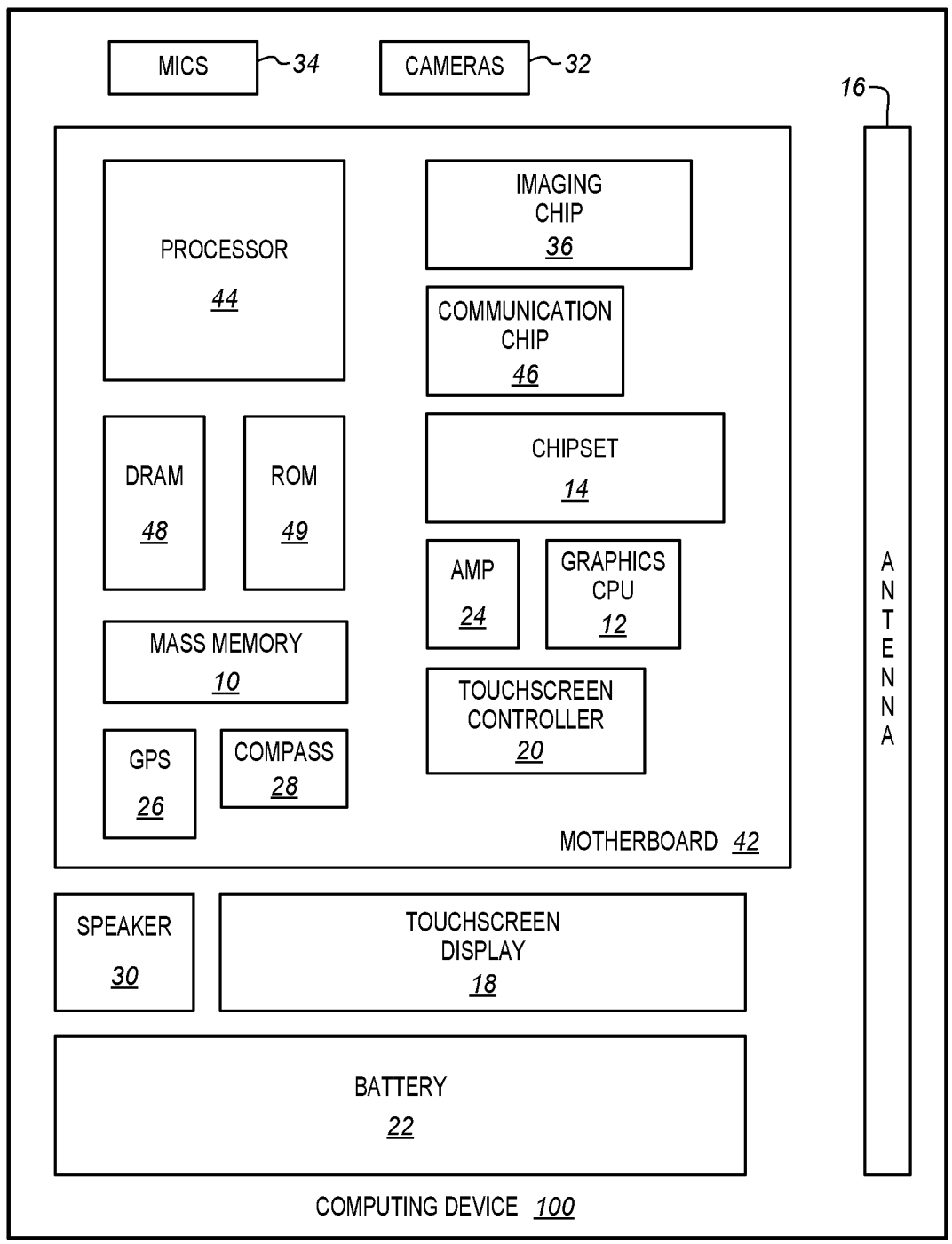
FIG. 7 is a block diagram of a computing device suitable for video capture, encoding, decoding, and display according to an embodiment.

FIG. 7 illustrates a computing device 100 in accordance with one implementation. The computing device 100 houses a system board 42. The board 42 may include a number of components, including but not limited to a processor 4 and at least one communication package 46. The communication package is coupled to one or more antennas 16. The processor 44 is physically and electrically coupled to the board 42.

Depending on its applications, computing device 100 may include other components that may or may not be physically and electrically coupled to the board 42. These other components include, but are not limited to, volatile memory (e.g., DRAM) 48, non-volatile memory (e.g., ROM) 49, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 42, mounted to the system board, or combined with any of the other components.

The camera array may be coupled to an image chip 36 and to the processor 4, either directly or through the image chip. The image chip may take a variety of different forms, such as a graphics co-processor, a digital signal processor (DSP), an image signal processor (ISP), or any other type of separate dedicated imaging management module. Such a device or module may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the image processing may be implemented as a standalone chip or integrated circuit, or as circuitry comprised within the processor, within a graphics chip or other integrated circuit or chip, or within a camera module. The techniques described above may be implemented in the image chip of the processor or functions may be distributed between different components which may include the cameras, image chip, processor, and other components.

The communication package 46 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 46. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

The camera array 32 may be of the type described in reference to FIGS. 1, 2, and 3 or another suitable configuration. The camera array may be incorporated into the same housing as the rest of the computing device 100 or it may be a separate peripheral device attached through a suitable wired or wireless connector. The computing device may be used a server device, editing device, or client device in a fixed or portable configuration.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method that includes receiving a wide field of view video, receiving position data from a remote coupled user device, selecting a region of interest in the video based on the received position data, extracting the region of interest from the video, generating region metadata describing the extracted region of interest, encoding the extracted region of interest of the video, and transmitting the encoded video with the region metadata to the user device.

In further embodiments the region metadata includes a center of the region of interest.

In further embodiments the center is indicated as a latitude and longitude of a viewport representation.

In further embodiments the region metadata includes a field of view of the region of interest based on distance from the center.

In further embodiments the field of view is indicated as a horizontal angle and a vertical angle.

In further embodiments the region metadata is encoded as a Supplemental Enhancement Information message.

In further embodiments the received wide field of view video is received from multiple cameras and stitched together to form a single wide field of view video, and wherein the received wide field of view video is an encoded rectilinear projection of the single wide field of view video.

In further embodiments the received wide field of view video is an encoded equi-rectangular projection of a spherical video, the method further comprising decoding the received wide field of view video before extracting the region of interest.

Further embodiments include decoding the received wide field of view video before extracting the region of interest and converting the extracted region of interest to a rectilinear format before encoding.

Further embodiments include generating metadata indicating a mode of the encoded video as including an extracted portion of the received video.

In further embodiments extracting a region of interest comprises extracting a region that includes an expected user device viewport plus a margin around the borders of the viewport.

In further embodiments generating region of interest metadata comprises generating a persistence flag to indicate that the region metadata applies also to subsequent frames.

Some embodiments pertain to a non-transitory machine-readable medium having instructions stored thereon that when executed cause the machine to perform operations that include receiving a wide field of view video, receiving position data from a remote coupled user device, selecting a region of interest in the video based on the received position data, extracting the region of interest from the video, generating region metadata describing the extracted region of interest, encoding the extracted region of interest of the video, transmitting the encoded video with the region metadata to the user device.

In further embodiments generating region metadata comprises generating an enhancement information message that includes a center of the region of interest and a horizontal and vertical range of the region of interest from the center.

Some embodiments pertain to an apparatus that includes a decoder to decode a received wide field of view video, a region extractor to receive position data from a remote coupled user device, to select a region of interest in the video based on the received position data, to extract the region of interest from the video, and to generate region metadata describing the extracted region of interest, and an encoder to encode the extracted region of interest of the video and to transmit the encoded video with the region metadata to the user device.

In further embodiments the region extractor extracts a region that includes an expected user device viewport plus a margin around the borders of the viewport.

Some embodiments pertain to a method that includes generating position data at a client device, sending position data to a remote coupled device, receiving encoded video at the client device, and receiving region metadata describing a region of interest in the encoded video based on the sent position data, decoding the received encoded video, extracting the region metadata, generating updated position data at the client device, and generating a viewport within the region of interest of the decoded video at the client device using the updated position data.

In further embodiments generating a viewport comprises shifting a viewport from the center of the region of interest in one or more directions using the updated position data.

In further embodiments the encoded video includes only the region of interest and wherein the region of interest has been extracted from a wide field of view video.

In further embodiments the region of interest has a wider field of view than the generated viewport.

What is claimed is:

1. A computer-implemented method of image processing, comprising:
receiving, at a client device, only a region of interest of an entire wide field of view frame of a video and associated with position data transmitted from the client device, wherein multiple possible viewport locations are within the region of interest;
receiving, at the client device, a description of the region of interest;
generating updated position data at the client device; and
generating a viewport within the region of interest at the client device using the updated position data.

2. The method of claim 1, wherein generating a viewport comprises shifting a viewport from a center of the region of interest in one or more directions and within the region of interest using the updated position data.

3. The method of claim 1, wherein the region of interest has a wider field of view than the generated viewport.

4. The method of claim 1, wherein the region of interest is sized to compensate for changes in updated viewport location over time.

5. The method of claim 1, wherein the description comprises a center of the region of interest.

6. The method of claim 5, wherein the center is indicated as a latitude and longitude of a viewport representation.

7. The method of claim 1, wherein the description is in the form of region metadata received with an encoded version of the video.

8. The method of claim 7, wherein the region metadata comprises a description encoded as a Supplemental Enhancement Information message.

9. The method of claim 7, wherein the client device is a head mounted display (HMD).

10. A computer-implemented method of image processing, comprising:
transmitting, to a client device, only a region of interest of an entire wide field of view frame of a video and associated with position data transmitted from the client device, wherein multiple possible viewport locations at the client device are within the region of interest; and
transmitting, to the client device, a description of the region of interest to generate a viewport within the region of interest at the client device using position data updated by the client device.

11. The method of claim 10, wherein the description comprises a field of view of the region of interest based on a distance from a center of the region of interest.

12. The method of claim 10, wherein the field of view is indicated as a horizontal angle and a vertical angle.

13. The method of claim 10, comprising generating the video comprising stitching together wide field of view videos received from multiple cameras to form a projection format, and generating a single wide field of view video wherein the projection format is an encoded rectilinear projection of the single wide field of view video.

14. The method of claim 10, comprising extracting the region of interest for transmission to the client device and from a wide field of view video that is an encoded equirectangular projection of a spherical video.

15. The method of claim 14, comprising converting the extracted region of interest to a rectilinear format before encoding the region of interest to transmit the region of interest to the client device.

16. The method of claim 10, wherein the description is in the form of region metadata provided with an encoded version of the video.

17. The method of claim 16, wherein the metadata comprises an enhancement information message that includes a center of the region of interest and a horizontal and vertical range of the region of interest from the center.

18. The method of claim 16, wherein the metadata comprises a persistence flag to indicate that the region metadata applies also to subsequent frames.

19. The method of claim 16, wherein the metadata indicates a mode of the encoded video as including an extracted portion of the received video.

20. A head mounted display (HMD), comprising:
at least one display means to be viewed by a user wearing the head mounted display (HMD);
means for transmitting position data of at least a position of the HMD;
means for receiving only a region of interest of a video rather than an entire wide field of view frame of the video and associated with the position data;
means for receiving a description of the region of interest and that corresponds to multiple possible viewport locations within the region of interest;
means for generating updated position data of the head mounted display; and
means for generating a viewport within the region of interest by using the updated position data.

21. The head mounted display of claim 20, wherein the description is region metadata received in a bitstream with an encoded version of the video.

22. The head mounted display of claim 20, wherein the description includes an indication of a center of the region of interest.

23. The head mounted display of claim 20, wherein the means for generating a viewport being arranged to shift a viewport from a center of the region of interest in one or more directions and within the region of interest using the updated position data.

24. The head mounted display of claim 20, wherein the region of interest has a wider field of view than the generated viewport.

25. The head mounted display of claim 20, wherein the region of interest is sized to compensate for changes in updated viewport location over time.

* * * * *